Figure 1:
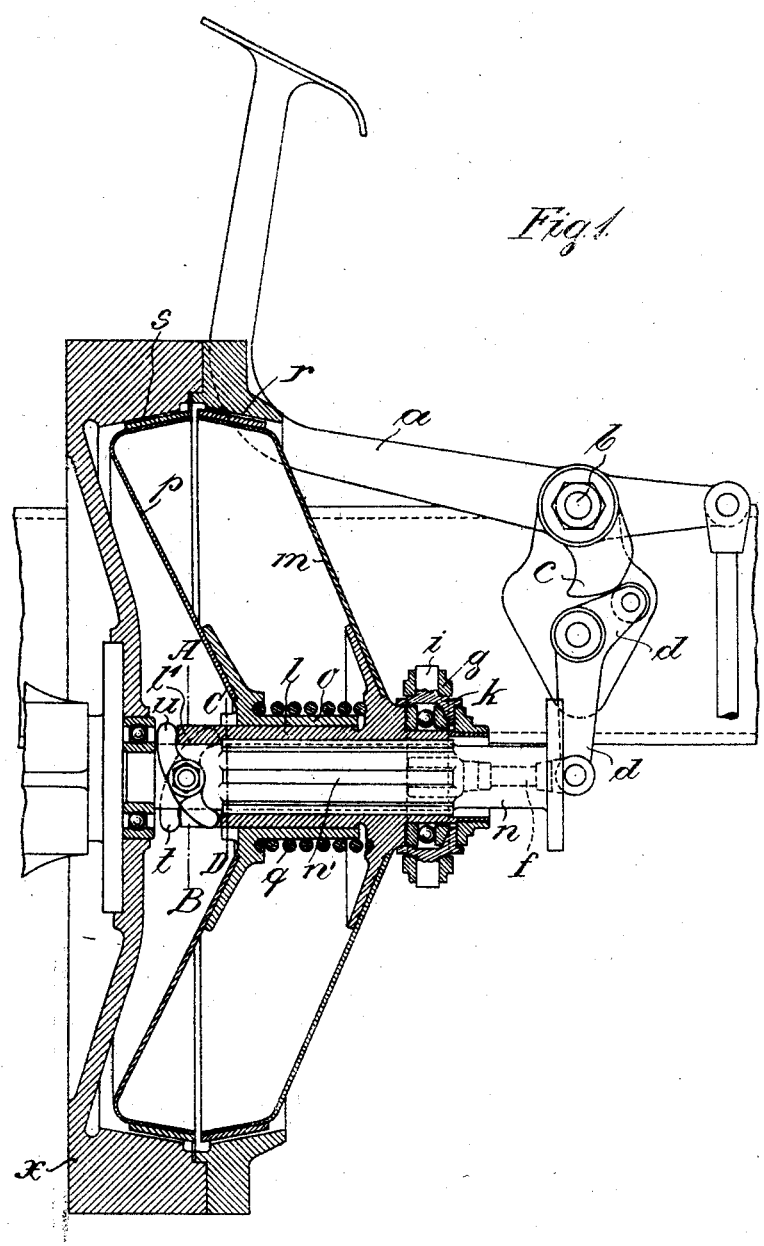

P. DAIMLER.
FRICTION COUPLING.
APPLICATION FILED MAY 11, 1908.

905,994.

Patented Dec. 8, 1908.

Witnesses:
Carl Ruff.
Paul Hinkelmann.

Inventor:
Paul Daimler.
Attorney.

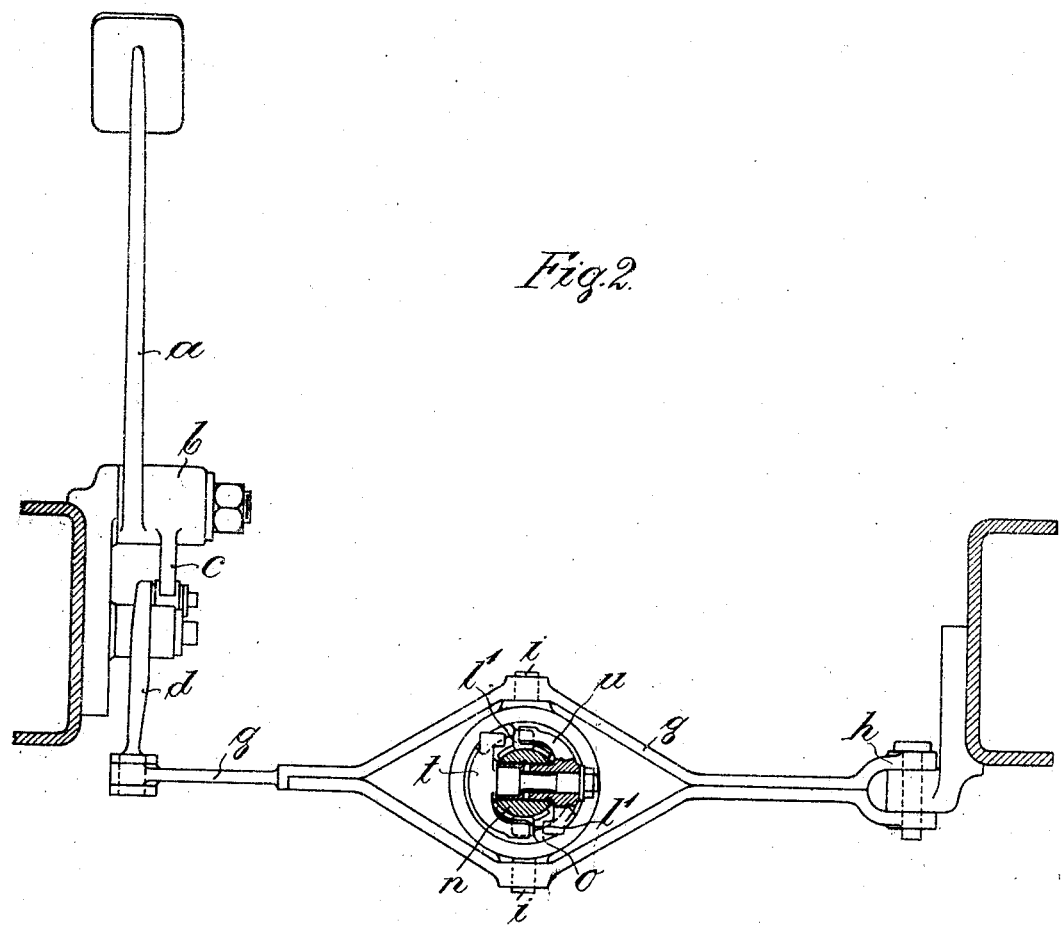

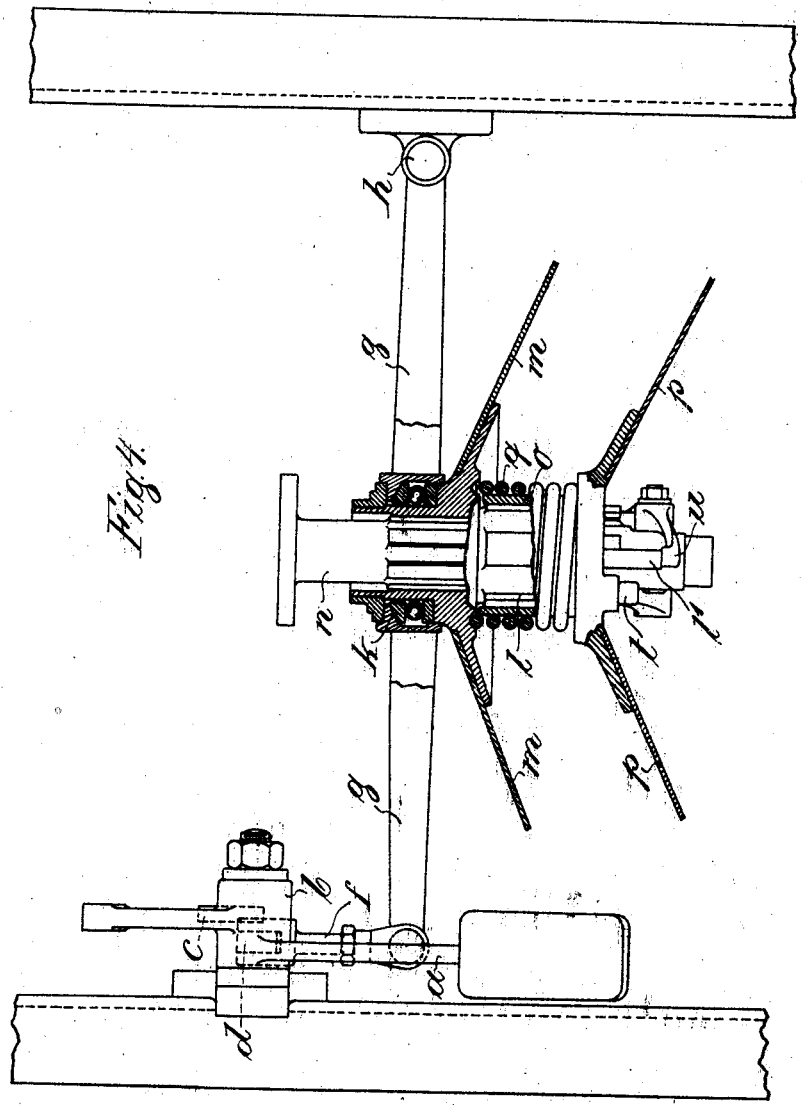

UNITED STATES PATENT OFFICE.

PAUL DAIMLER, OF UNTERTÜRKHEIM, NEAR STUTTGART, GERMANY, ASSIGNOR TO DAIMLER MOTORENGESELLSCHAFT, OF UNTERTÜRKHEIM-STUTTGART, GERMANY.

FRICTION-COUPLING.

No. 905,994.  Specification of Letters Patent.  Patented Dec. 8, 1908.

Application filed May 11, 1908. Serial No. 432,259.

*To all whom it may concern:*

Be it known that I, PAUL DAIMLER, a subject of the King of Würtemberg, and resident of Untertürkheim, near Stuttgart, Kingdom of Würtemberg, German Empire, have invented certain new and useful Improvements in Friction-Couplings, of which the following is an exact specification.

This invention relates to friction couplings in which two oppositely arranged friction members are moved in opposite directions by means of levers for the purpose of engaging or disengaging the coupling.

According to the present invention the actuating levers are connected to one of the relatively movable friction members only and further actuating mechanism is interposed between the concentrically arranged hubs of the sliding friction members so that when one of the members is moved in one direction the other member is moved in the opposite direction.

The accompanying drawings illustrate the present invention in one convenient form applied to an automobile and used between the engine shaft and the axle driving shaft.

Figure 1 is a section through a friction coupling according to the present invention. Fig. 2 is a section on the line A—B of Fig. 1 with parts removed. Fig. 3 is a section on the line C—D of Fig. 1. Fig. 4 is a plan partly in section with the conical friction surfaces removed so as to show arrangement of the hubs and actuating levers.

According to the form of this invention illustrated the foot treadle lever $a$ is pivoted at $b$ to a suitable part of the automobile frame. The hub of the lever $a$ is also provided with a nose piece $c$ adapted to operate a double armed lever $d$ which is connected by means of a forked lever $g$ to the trunnions $i$ of a gimbal ring adapted through a ball bearing $k$ to bear against the end of the hub $l$ of one of the friction members $m$. The lever $g$ is pivoted at $h$ to the vehicle frame. The hub $l$ surrounds the shaft $n$ and is slidable thereon while at the same time it is fixed by means of feathers $n'$ as indicated to rotate with said shaft.

On the exterior of the hub $l$ there is arranged a further hub $o$ belonging to the other friction member $p$. The hub $o$ is slidable on but rotatable with the hub $l$ and both friction members $p$ and $m$ are normally held apart by means of a spring $q$ surrounding the hub $o$. The relatively slidable friction members $p$ and $m$ are provided with conical friction surfaces $r$ and $s$ arranged in opposite directions to each other *i. e.* the conical surfaces converge in opposite directions. The relatively moving friction members coact with relatively fixed surfaces on a member $x$ fixed to the other shaft, say the driven shaft of the pair.

On the end of the shaft $n$ there are arranged two centrally pivoted levers $t$ and $u$ which are bent in the form shown in Fig. 2. The hub $l$ is provided with diametrically opposite projections $l'$ which engage one with the upper end of lever $u$ and the other with the lower end of lever $t$ as can be seen in Fig. 2. In Fig. 1 the lower projection $l'$ is not shown in section and the lever $u$ is shown complete. It will be understood from Fig. 2 that the lower end of the lever $u$ does not bear against the hub $l$ but against the hub $o$ which is also provided with projection parts adapted to coöperate with the opposite ends of the levers $t$ and $u$ to those which bear against the projecting parts $l'$. In Fig. 3 the dotted lines indicating the levers $t$ and $u$ show clearly how these levers are arranged. It will be seen from the drawings that when the lever actuating means $a\,g$ are operated the member $m$ is moved to the left and simultaneously the separate lever mechanism $t\,u$ is brought into operation by the concentrically arranged hubs to transmit to the member $p$ an oppositely directed motion.

I claim:—

1. A friction clutch having in conjunction with a driving and a driven shaft, two oppositely arranged conical friction members relatively slidable on one of said shafts and having their hubs arranged concentrically, a co-acting friction surface carrying member on the other shaft, a spring surrounding the concentric hubs of the movable friction members and normally holding said members in engagement with their co-acting friction surfaces, lever mechanism engaging one of said relatively moving friction members and levers pivoted to the shaft carrying the friction members and coöperating with the concentrically arranged hubs of said members for simultaneously transmitting an oppositely directed motion to the other movable friction member.

2. A friction clutch having in combination with a driving and a driven shaft relatively movable friction members mounted on one of said shafts with concentrically arranged hubs, a member carrying co-acting friction surfaces carried by the other shaft, projections on the concentrically arranged hubs of the relatively moving members, levers pivoted on the carrying shaft, said levers bearing at opposite ends against projections on different hubs and a spring normally holding the friction members in engagement with their co-acting surfaces.

In witness whereof I have hereunto set my hand in the presence of two witnesses.

PAUL DAIMLER.

Witnesses:
 ROBERT UHLAND,
 ERNEST ENTENMANN.